United States Patent [19]

Chang et al.

[11] Patent Number: 5,118,752
[45] Date of Patent: Jun. 2, 1992

[54] VINYL POLYMER LATEX SYSTEMS

[75] Inventors: Wen-Hsuan Chang, Gibsonia; Marvin L. Kaufman, Pittsburgh; Edward E. McEntire, Allison Park; James C. Su, Mars; Anbazhagan Natesh, Wexford, all of Pa.

[73] Assignee: PPG Industries, Inc., Pittsburgh, Pa.

[21] Appl. No.: 776,104

[22] Filed: Oct. 15, 1991

[51] Int. Cl.$^5$ .............................................. C08L 27/06
[52] U.S. Cl. .................................. 524/521; 524/458; 524/460; 526/279
[58] Field of Search ................ 526/279; 524/521, 458, 524/460

[56] References Cited

U.S. PATENT DOCUMENTS

| 4,380,600 | 4/1983 | Hosodo et al. | 524/460 |
| 4,543,398 | 9/1985 | Bany et al. | 526/279 |
| 4,975,509 | 12/1990 | Joslyn et al. | 526/279 |

Primary Examiner—Paul R. Michl
Assistant Examiner—Olga Asinovsky
Attorney, Agent, or Firm—Linda Pingitore

[57] ABSTRACT

An aqueous polymer emulsion latex is claimed composed of particles comprising a vinyl polymer and a surfactant containing at least one hydrophobic moiety and at least one hydrophilic moiety and also carrying silicon moieties and amido functionalities. Also claimed are coating compositions containing the aqueous polymer emulsion latex, processes for preparing the aqueous polymer emulsion latex wherein ethylenically unsaturated monomers are polymerized in the presence of a surfactant containing a silicon moiety and amido functionality, and substrates carrying a coating composition containing the aqueous polymer emulsion latex.

61 Claims, No Drawings

VINYL POLYMER LATEX SYSTEMS

CROSS REFERENCE TO RELATED U.S. PATENT APPLICATIONS

1. U.S. patent application Ser. No. 07/776040, filed concurrently herewith, of Wen Hsuan Chang, John F. Grunewalder, Mark A. Harley and Edward E. McEntire for "Silanes Carrying Water Solubilizing and Hydrophobic Moieties" and 2. U.S. patent application Ser. No. 07/775890, filed concurrently herewith, of Wen Hsuan Chang, John F. Grunewalder, Mark A. Harley and Edward E. McEntire for "Stable Aqueous Solutions Containing Siloxanes for Treating Cellulosic Material".

BACKGROUND OF THE INVENTION

This invention relates to an aqueous polymer emulsion latex composed of particles comprising a vinyl polymer and a surfactant containing hydrophobic and hydrophilic moieties wherein said latex contains silicon moieties and amido functionalities and to processes for preparing the same. This invention additionally relates to coating compositions containing such aqueous polymer emulsions, to processes for coating a substrate and to the coated product resulting therefrom. The aqueous polymer emulsion latex when applied as a coating on a substrate and cured at ambient or elevated temperature, has been found to have excellent solvent, chemical and water resistance, exterior durability, impact resistance, abrasion resistance, excellent adhesion to a variety of substrates etc.

In general, materials that can be used as our surfactants are not new. The prior art discloses the preparation and use of water-based organic compounds having both silane and ionic functionality. Thus, Chang in U.S. Pat. No. 3,941,733 discloses the preparation of a water-based poly(urethaneurea), terminated by hydrolyzable or hydrolyzed silyl groups and carrying solubilizing moieties, useful for coating leather. Similarly, Gaa et al in U.S. Pat. No. 4,582,873 prepare water-based poly(urethane) urea polymers carrying pendant siliconate anions and solubilizing moieties for use as coating materials. Tominaga in EP 0276469 uses ionic functional polyacrylate and polyepoxide resins carrying silane functional groups as water-based electrodeposition coating compositions.

The synthesis of latexes in the presence of a surfactant not containing a silicon moiety is not new. For example, the prior art also discloses the polymerization of ethylenically unsaturated monomers in the presence of ionic-functional water based polymers to produce latexes. Thus, Ranka et al in U.S. Pat. No. 4,647,612 disclose the use of an acid salt group containing polyurethane in the polymerization of a polymerizable alpha, beta-ethylenically unsaturated monomer. In U.S. Pat. No. 4,318,833 Guagliardo polymerizes an ethylenically unsaturated monomer in the presence of a water-soluble polyurethane composition formed by the reaction of a diisocyanate compound with a polyol and a compound containing an acid sat group. In U.S. Pat. No. 4,644,030 Loewrigkeit et al also polymerize an ethylenically unsaturated monomer in the presence of a polyurethane carrying a pendant carboxylic group, in salt form, for use as a coating composition. In none of these references, however, does the ionic-functional water based polymer contain silicon.

It is also known in the prior art that latexes containing silicon can be prepared with silicon free surfactants, and that these latexes can be mixed with water soluble silicon containing resins. For example, Takayuki Kamiie et al disclose in Japanese Patent No. SHO 61 [1986]-47178 an aqueous coating composition for coating an inorganic building material which consists of (A) a water-soluble or water-dispersible acrylic copolymer containing alkoxysilane and carboxyl groups and (B) colloidal silica. In Japanese Patent No. SHO 61 [1986-155474 Takayuki Kamiie et al disclose a coating composite containing (A) a water soluble or water dispersible acrylic copolymer containing alkoxysilane and carboxyl groups and (B) an aqueous resin dispersion prepared by emulsion copolymerization in an aqueous medium (1) an alpha,beta-ethylenically unsaturated monomer, (2) a monomer containing a polymerizable unsaturated double bond and an alkoxysilane group and (3) colloidal silica. These Japanese systems, therefore, are made up of two separate and distinct entities. This is obviously true of the above Japanese Patent No. 47178. As to the above Japanese Patent No. 155,474, the one entity is comprised of a water soluble or water dispersible acrylic polymer containing alkoxysilane and carboxyl groups, while the other entity contains a vinyl resin carrying a silicon moiety, a surfactant devoid of silicon and colloidal silica. Kawakami et al in Japanese Kokai Tokkyo Koho JP 02,178,301 disclose the emulsion polymerization of ethylenically unsaturated silyl-reactive monomers in the presence of an acrylic water-soluble silyl containing acrylate resin. The present invention, however, involves the use of surfactants containing hydrophobic and hydrophilic moieties, silicon moieties and amido functionalities for the preparation of novel aqueous polymer emulsion latexes composed of particles comprising a vinyl polymer and a surfactant containing hydrophobic and hydrophilic moieties wherein said latexes contain silicon moieties and amido functionalities.

SUMMARY OF THE INVENTION

The invention described and claimed herein relates to (1) an aqueous vinyl polymer emulsion latex composed of particles comprising a vinyl polymer and a surfactant containing hydrophobic and hydrophilic moieties wherein said latex contains silicon moieties and amido functionalities, (2) coating compositions containing such vinyl polymer latex, (3) a process for preparing said vinyl polymer latex and (4) a substrate carrying a coating obtained from said vinyl polymer latex.

DETAILED DESCRIPTION OF THE INVENTION

The vinyl polymer latex claimed herein is obtained as the result of the polymerization of ethylenically unsaturated monomers in the presence of surfactants (emulsifiers) containing hydrophobic and hydrophilic moieties, silicon moieties and amido functionalities. The amido group is commonly defined by the following structure:

where $R^1$ is hydrogen or any organo group. Here we define the amido group as being linked to the organic portion of the molecules by the atoms selected from the group consisting of nitrogen, oxygen or carbon. For example, when nitrogen is connected from the carbonyl group to the organic section of the molecule, the group is commonly known as urea; when oxygen is connected from the carbonyl to the organic section, the group is commonly known as urethane; and when carbon is connected from the carbonyl to the organic section, the group is commonly known as amide. In addition, the surfactant (emulsifier) must be able to disperse mainly water insoluble ethylenically unsaturated monomers in a aqueous system, and must give a stable aqueous polymer emulsion latex after polymerization of said ethylenically unsaturated monomers. Materials containing silicon moieties, used herein as surfactants, are known and are exemplified, for example, for Chang in U.S. Pat. No. 3,941,733, Gaa et al in U.S. Pat. No. 4,582,873 and Tominaga et al in EP 0276469, referred to above, but have not been known, or used as surfactants, in the process used herein to obtain the novel aqueous polymer emulsion latex. Non-limiting examples of surfactants (emulsifiers) containing such silicon moieties and amido functionalities that can be used herein include polyurethanes, polyacrylates, polyepoxides, polyesters, alkyds, vinyls, polyolefins, etc. The surfactants may be anionic, cationic or non-ionic.

A preferred embodiment herein for the preparation of anionic surfactants containing silicon moieties and amido functionalities involves the use of polyurethanes as the polymer type. In this embodiment, an NCO terminated solution polymer or prepolymer is prepared using a polyol containing an acid functional group, for example, dimethylolpropionic acid, a polyisocyanate, such as methylene bis(isocyanato cyclohexane) and optionally another suitable polyol. The NCO terminated prepolymer so obtained is typically then reacted with an aminosilane to yield a carboxylic acid and silane functional polymer. After the acid and silane functional polymer is prepared, one or more ethylenically unsaturated monomers, such as styrene, methyl methacrylate, butyl acrylate, ethyleneglycol dimethacrylate or 3-methacryloxypropyltrimethoxysilane are added thereto. The resulting solution of acid and silane functional polymer and unsaturated monomers are then dispersed in water with the aid of a base, for example, a tertiary amine, resulting in a dispersion in which the anionic and silane functional polyurea-polyurethane polymer serves herein as the emulsifying agent.

To obtain the novel vinyl polymer latex claimed herein, a free radical initiator, such as ammonium persulfate, or a redox initiator, such as ammonium persulfate/sodium metabisulfite or peroxide or azo-type initiator is added to the aqueous dispersion obtained above and the ethylenically unsaturated monomers therein, are then subjected to free radical polymerization under aqueous conditions to obtain the vinyl polymer. The resulting product is an aqueous polymer emulsion latex containing particles comprised of a surfactant carrying anionic and silicon moieties and amido functionalities and a vinyl polymer formed via a free radical polymerization that is eminently suitable for preparing thermosetting coatings that have high resistance to aqueous and organic solvents and chemicals.

More specifically, in the preferred embodiment herein, the first step involves the preparation of an NCO-terminated prepolymer, a preparation well known in the art, as exemplified in the reference discussed above. Thus, herein a diisocyanate, for example, methylene bis(isocyanatocyclohexane), DDI-1410 diisocyanate (Henkel Corporation) or mixtures thereof, diols, for example a polyester, such as poly-(neopentylglycol)-co-adipate) and/or a polyether diol, such as polyoxybutylene glycol, having molecular weights from about 500 to about 4000, preferably about 1000 to about 2500, and acid functional diol, for example, dimethylol propionic acid, and, optionally, a catalyst, for example, dibutyltin dilaurate, and optionally a solvent, such as N-methylpyrrolidone, when needed to provide fluidity to the mixture, are reacted.

The components defined above and the manner in which they are reacted are well known in the art. The concentration of the acid functional diol present in the mixture is maintained within a range so that the resulting latex is stable after polymerization. Depending upon the hydrophilicity of the polymer, the concentration of the acid used may vary. Generally, for best results, the final acid number (milligrams KOH/gram solids) of the vinyl polymer latex obtained herein is from about 1.0 to about 125 (based on the solids content of the latex), with a preferred range of from about 20 to about 100 (based on the solids content of the latex). In some cases, if desired, regular surfactants, those not containing a silicon moiety can also be added to help stabilize the dispersion before, during and after polymerization. Also, surfactant mixtures in which one surfactant contains a silicon moiety and another surfactant contains an amido functionality can be used. If solvents are not used the NCO terminated prepolymer is prepared generally by heating the above materials at a temperature of about 130° C. or at a temperature at which the viscosity is manageable and reaction between the acid group on the acid functional diol and the isocyanate is minimized, for example, between about 80° to about 150° C. If a solvent is used, any of the known common solvents, known to be unreactive with isocyanate, such as ketones, esters, etc., and especially N-methylpyrrolidone can be used. In place of, or in addition to the solvents discussed above, the vinyl monomers which are to be subsequently polymerized, can also be used as the solvent. Generally, when solvents are used, the reaction temperature can be lower than when solvents are not used. In any event, the reaction temperature chosen, with or without solvent, will be that which results in suitable reaction times, for example, from about 0.5 to about 24 hours, at manageable reaction viscosities.

Typically after the NCO-terminated prepolymer has been synthesized, as described above, the ethylenically unsaturated monomer, or mixtures of ethylenically unsaturated monomers, which will later be polymerized, are generally added thereto. The weight ratio of prepolymer to monomer can be in a wide range, for example, from about 90:10 to about 10:90, preferably from about 70:30 to about 30:70 and most preferably from about 60:40 to about 40:60. Thus the weight ration of surfactant to vinyl polymer in the final latex will be from about 90:10 to about 10:90 and preferably from about 70:30 to about 30:70 and most preferably from about 60:40 to about 40:60. If the monomers used during the subsequent polymerization are NCO reactive, and one does not wish to prereact the NCO group with the said monomers, for example, hydroxyethyl methacrylate or t-butylaminoethyl methacrylate, these monomers are typically withheld and added just before the solution is dispersed in water or added immediately after dispersion. After the monomers are added to the NCO terminated prepolymer and the solution is cooled, for example, to a temperature in the range of about 20° to about 50° C., depending upon the viscosity thereof, any of the aminosilanes generally used in the art are reacted with the isocyanate prepolymer to obtain the corresponding silane functional urethane. We prefer to use 3-aminopropylmethyldiethoxysilane. The amount of the aminosilane used can vary over a wide range, generally in an amount sufficient to react between about 10 to about 100 percent of the remaining isocyanate of the NCO prepolymer. Usually the aminosilane will react with the isocyanate, for example, in a matter of about a few minutes. If it is desired to put a grafting site for the subsequent vinyl polymerization on the NCO terminated urethane prepolymer, this can be done, for example, by adding thereto an isocyanate reactive (meth)acrylate, such as hydroxyethyl methacrylate or t-butylaminoethyl methacrylate(t-BAEMA) or glycerol monoacrylate or diacrylate, when there are still isocyanate groups present. By using this procedure, when the latex is formed, the latex particle formed will be a crosslinked vinyl polymer copolymerized with the emulsifier.

In the following step, the carboxylic acid, present on the silane functional urethane solution prepolymer, is neutralized in any known manner, for example, with the addition of a tertiary amine, such as triethyl amine. Other compounds used in the art to conduct the neutralization, are for example, dimethylethanolamine, ammonia or potassium hydroxide. However, in some cases it is desirable to add the neutralizing bases to the water phase, instead of the solution polymer phase as stated above. The solution polymer is then added to the water phase with rapid stirring of the water phase. The weight of water relative to the solution polymer or prepolymer can vary over a wide range, for example, from about 10:1 to about 0.5:1, preferably from about 4:1 to 0.8:1. If some isocyanate is still present, which is generally the case, then the isocyanate present therein can be reacted by having a chain extender, for example, a diamine, such as ethylene diamine, present either initially in the water phase prior to dispersion or added after dispersion. Other mono-, di- or polyamines or mono- or polyols can also be used to react the excess isocyanate. If no chain extender is used, water will react with the residual isocyanate and will function as a chain extender. As the solution polymer is added to water, it forms a dispersion very rapidly, and this dispersion is usually quite stable. It is also possible to add the water to the solution polymer to form a dispersion. As described above, the neutralizing amine may be added to the solution polymer prior to the addition of water or it can be added with the water. The chain extender, if used, can be added with the water or after the dispersion is made.

The final reaction step involves subjecting the water based dispersion containing the silicon-functional urethane surfactant and ethylenically unsaturated monomers to polymerization conditions such that the ethylenically unsaturated monomers are converted to the corresponding latex vinyl polymer. Conditions used in emulsion polymerizations are well known in the art. In our preferred embodiment, the polymerization is carried out using ammonium persulfate or an ammonium persulfate/sodium metabisulfite redox initiator in an amount of about 0.05 to about 0.4 weight percent of each, based on the weight of the monomers in the system, usually at a temperature in the range of about 25° to about 95° C. Other initiators useable herein are disclosed in U.S. Pat. No. 4,647,612, to Ranka et al, in column 4, lines 60 to 68 and column 5, lines 1 and 2. An exotherm is usually observed during the polymerization. In cases where the molecular weight of the vinyl polymer can be measured experimentally be gel permeation chromatography (i.e. when neither grafting or crosslinking of the vinyl polymer has occurred), the molecular weights are typical of emulsion type polymers (i.e. 500,000 to over 1,000,000). Lower molecular weights can be obtained by utilizing chain transfer agents such as mercaptans, during the polymerization. After the polymerization stage is over, usually within a matter of about five minutes to about five hours, the resulting product is cooled and then filtered. If desired additional monomer may be added either during or after the polymerization. In the latter case, additional initiator may have to be added to continue the polymerization until all of the monomer has been polymerized. This added monomer may be the same or different than that initially present. The resulting product is one of our preferred embodiments of the vinyl polymer latex, claimed herein, having a solids content of about 5 to about 60 weight percent, preferably about 20 to about 50 weight percent, having an ionic functionality of about 0.018 to about 2.25 milliequivalents per gram, generally about 0.036 to about 1.8 milliequivalents per gram, but most preferred about 0.048 to about 1.6 milliequivalents per gram, based on the solid content of said latex, a concentration of about 0.002 to about 6.0 weight percent, generally about 0.008 to about 4.0 weight percent, but most preferred about 0.012 to about 2.5 weight percent of silicon, based on the solids content of said latex. The silicon in the latex is in the form of an organosilicon moiety X, defined below, containing at least one A group, consistent with the following structural formula:

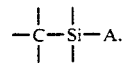

wherein A can represent, for example, OH, OR$^2$,

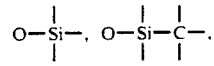

halogen such as Cl or

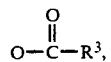

R$^2$ representing an alkyl group having one to four carbon atoms and R$^3$ representing H or an alkyl group having one to four carbon atoms.

There are many advantages to the procedure used above for obtaining the desired vinyl polymer latex. Since the ethylenically unsaturated monomer is intimately mixed with the surfactant used herein in the reaction medium, the resulting vinyl latex polymer after polymerization is essentially composed of single entities containing both the vinyl polymer and the surfactant carrying the silicon moiety and amido functionality. Therefore, the resulting vinyl polymer latex yields films on substrates that will be uniform and display increased resistance to aqueous and organic environments than similar vinyl polymer latexes containing the surfactant not bearing a silicon moiety. In addition, while the surfactant bearing a silicon moiety may be hydrophilic initially, we believe it is capable of forming a hydrophobic film and thus would eliminate the water sensitivity of the coating associated with the use of regular surfactants. Thus, we are not restricted to the use of minimal amounts of conventional surfactants in making resins, but in fact, can use either minimal amounts or even, preferably, large amounts of the surfactants containing the silicon moiety, since their presence do not detract from film performance but generally enhances film performance. The presence of the amido group also gives unusually good properties, e.g. toughness, crack resistance and solvent resistance. Although we are not bound by theory, we believe the amido groups, having unusually high cohesive energies, often cause the films derived to have microscopic phase separation. Thus a coating will be obtained which is flexible, tough and hard.

As stated above, the reactants employed herein for the preparation of the NCO terminated prepolymers are well known in the art. Thus, diisocyanates useful herein are described in U.S. Pat. No. 3,941,733 to Chang in column 4, lines 22 to 51; polyols in column 4, lines 52 to 68, column 5, lines 1 to 68 and column 6, lines 1 to 25, therein; and the desired ionic functionality derived from carboxylic, sulfonic, phosphonic or phosphoric acid in column 7, lines 26 to 28, and column 8, lines 1 to 14, also therein. Silanes useful herein include those defined in column 6, lines 38 to 68 and column 7, lines 1 to 25 in Chang. In addition to the reactive silanes containing three hydrolyzable groups as described in Chang, those reactive silanes which contain one or two hydrolyzable groups are also usable. For example, 3-aminopropylmethyldiethoxysilane or 2-aminoethyl-3-aminopropylmethyldiethoxysilane (i.e. containing two hydrolyzable groups) in some cases are preferable to those silanes described in Chang. Chain extenders that can be used are defined in column 19, lines 35 to 68, and column 20, lines 1 to 10, in U.S. Pat. No. 4,147,679 of Scriven et al. Ethylenically unsaturated monomers polymerizable herein are also well known in the art and include those defined in column 4, lines 4 to 55 in U.S. Pat. No. 3,705,164 to Honig, in column 5, lines 15 to 40 in U.S. Pat. No. 4,318,833 to Guagliardo and on page 5, lines 10 to 25 of EP 0276469 of Tominaga.

It is possible to prepare polyurethane surfactants by synthetic routes different from the NCO prepolymer route described above. For example, an hydroxyl terminated prepolymer can be prepared by changing the ratio of isocyanate to polyol from an excess of isocyanate to an excess of polyol (as is well known in the art). The resulting acid functional, hydroxyl terminated prepolymer can be reacted with an isocyanatosilane such as 3-isocyanatopropyltriethoxysilane to form a polyurethane surfactant containing a silicon moiety and an amido functionality.

To obtain cationic urethane latexes corresponding to the anionic latexes described above, the following changes would be made. The acid functional diol would be replaced with an amino-functional diol, such as methyldiethanol amine, and the neutralizing base would be replaced with a neutralizing acid, such as acetic acid or lactic acid. The ethylenically unsaturated monomers and the polymerization reaction conditions would remain substantially the same as described above. In this respect, see U.S. Pat. No. 4,318,833 to Guagliardo referred to above, column 4, lines 56 to 68, and column 5, lines 1 to 8 for the preparation of a cationic urethane polymer, not containing a silicon moiety and the subsequent polymerization of a vinyl latex.

To obtain non-ionic urethane latexes corresponding to the anionic and cationic latexes described above, the procedure in Example 1 of Noll in U.S. Pat. No. 3,905,929 could be used with the following changes. The polyester, dispersing agent A and the isophorone diisocyanate are heated for three hours at 90° C. under a nitrogen atmosphere. When the reaction is complete, ethylenically unsaturated monomers are added and the mixture is cooled to 30° to 40° C. Aminosilane equal to the concentration of isocyanate present is added and the mixture is dispersed into water with vigorous stirring. Initiators are added and the ethylenically unsaturated monomers are polymerized to yield a vinyl polymer latex.

In this invention, we find that the amido group and the silicon moiety do not have to be in the same molecule. Thus we have made polyurethane emulsifiers containing the amido group without the silicon moiety and have made surfactants with silicon moieties but without the amido groups.

Another preferred embodiment herein for the preparation of silicon functional polymers usable as surfactants in combination with our surfactants carrying silicon moieties and amido functionality involves the use of polyacrylates as the polymer type. Kamiie et al disclose in Japanese Patent No. SHO 61[1986]-47178, the preparation of water dispersible polyacrylates carrying silicone moieties, as does Tominaga, in EP 0276469. Our patent application Ser. No. 07/388,173, filed Jul. 31, 1989 also discloses the preparation of polyacrylates containing silicon moieties. The above referenced polyacrylates both describe anionic functional polyacrylates, while Tominaga, also discloses cationic polyacrylates containing silicon moieties. One method for the preparation of these polyacrylates can involve synthesizing a solution polymer (which serves as surfactant for the subsequent polymerization) containing both an ionic group or a precursor of an ionic group and a silicon moiety. Thus, for an anionic latex, a (meth)acrylic acid functional solution polymer can be prepared in which a methacryloxyalkylalkoxysilane can be copolymerized. Similarly, for a cationic latex, an amino-functional solution polymer can be prepared in which a methacryloxyalklalkoxysilane can be copolymerized. Ethylenically unsaturated monomers can then be added to the solution polymer and the mixture can then be dispersed into water, initiators added and the monomers polymerized to give the vinyl polymer latex.

Alternatively, an ionic functional or precursor to an ionic functional solution polymer containing a second functional group can be prepared and the second functional group can subsequently be converted to a silicon moiety. For example, the second functional group can be an hydroxyl group which would be reacted with an isocyanatoalkylalkoxysilane to provide the desired silicon moiety and amido functionality. Addition of ethylenically unsaturated monomer followed by dispersion and polymerization would yield the desired latex. Still another embodiment can involve the synthesis of a solution polymer containing an anhydride functional group. In a subsequent step, the anhydride is then reacted with an aminoalkylalkoxysilane, yielding a solution polymer containing acid functionality (ionic) and both the silicon moiety and amido functional groups. Again, addition of ethylenically unsaturated monomer followed by dispersion into water and polymerization of the monomer gives the desired vinyl polymer latex.

In preparing the polyacrylate surfactants containing the silicon moiety, which can be used in combination with our surfactants carrying silicon moieties and amido functionality, an ethylenically unsaturated acid, such as (meth)acrylic acid, as well as those defined in Japanese Patent No. 155,474 referred to above, as the ionic functional monomer and an unsaturated alkoxysilane, as defined in said Japanese Patent No. 155,474, as the silicon moiety can be employed. In addition to the ethylenically unsaturated acid and unsaturated alkoxy silane other monomers, such as previously described, can be used. In a typical situation, 3-methacryloxypropyltrimethoxysilane and acrylic acid are used to provide the silicon and ionic moieties. The procedure involves polymerizing the monomers in solvent. After the solution polymerization is complete, the reaction mixture is cooled, resulting in an acrylic solution polymer containing an acid functional group and an alkoxysilane functional group. The solution acrylic polymer is combined with a polyurethane solution polymer containing amido functionality and silicon moieties, as described above, ethylenically unsaturated monomers are then added, followed by a base such as triethylamine and the mixture dispersed into water. Addition of initiators and polymerization of the ethylenically unsaturated monomers results in an aqueous vinyl polymer emulsion latex. We have observed that addition of as little as 2 weight percent (based on the total latex solids) of a surfactant containing silicon moieties and amido functionalities (which corresponds to the presence of at least 0.3 weight percent total amido e.g.

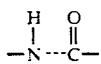

group, based on latex solids) significantly improves the solvent and water resistance and blister resistance of coatings containing acrylic surfactants which do not contain amido functionality. Amido functional surfactants not containing silicon moieties can also be used with the acrylic surfactants containing silicon moieties. For example, the acrylic surfactant described above can be combined with a surfactant containing amido functionality, such as the water dispersible polyurethane WRV-7255 (available from PPG Industries, Inc.). Addition of ethylenically unsaturated monomers, dispersion into water, initiation and polymerization gives a vinyl polymer emulsion latex.

The carboxylic acid (ionic), the silicon moieties and the amido functionality can be incorporated into acrylic surfactants by routes other than described above. For example, in one embodiment, an acrylic solution polymer is prepared using maleic anhydride as a coreactant following the procedure described above. To the resulting solution polymer for reaction therewith is added an anhydride reactive alkoxysilane, such as a 3-aminopropyltrimethoxysilane. The reaction of the aminotrimethoxysilane with the anhydride results in the formation of a carboxylic acid (precursor to the ionic group) and simultaneously in the formation of an amide containing the trimethoxysilane moiety. The acrylic polymer thus contains necessary functional groups, the precursor ionic group for dispersibility in water, the alkoxysilane group (the silicon moiety precursor), and the amide group (amido functionality). It is then diluted with monomer, neutralized, dispersed and polymerized as described above. If the anhydride polymer were partially reacted with a tertiary aminoalcohol such as dimethylaminoethanol, and the remainder of the anhydride then further reacted with the aminotrialkoxysilane, the result would be an amphoteric surfactant.

In yet another alternate procedure, an acrylic polymer containing an acid group and a second functional group which can be converted to an alkoxysilane group is prepared. For example, an hydroxyl group can be inserted into the polymer by co-polymerization with an acrylate, such as hydroxyethyl acrylate or methacrylate. The hydroxyl group in the polymer is then reacted with an isocyanato functional silane, such as 3-isocyanatopropyl triethoxysilane, with the silane becoming attached to the acrylic polymer by way of the urethane linkage. Thus the acrylic polymer contains the required acid functionality, silicon moiety and amido functionality.

In an alternate procedure, an acrylic polymer containing an acid group can be partially reacted with an isocyanatosilane, such as 3-isocyanatopropyltriethoxysilane, to give an acrylic polymer containing amidopropyltriethoxysilane functionality (silicon moiety and amido functionality) and acid moieties (precursor to anionic functionality).

In still another procedure, an isocyanate can be incorporated into the acrylic polymer by way of co-polymerization with m-isopropenyl, alpha, alpha-dimethylbenzyl isocyanate. The isocyanate functional acrylic is then reacted with an aminoalkoxysilane and the silicon moiety precursor will then be attached to the polymer by way of an urea linkage.

It is also possible to employ other reactions placing alkoxysilane functional groups on the acrylic polymer, provided the polymer resulting therefrom carries the necessary hydrophilic group (e.g. ionic group) and the silicon moiety and amido functionality. In all cases they would be treated with monomer and neutralizing group and then dispersed in water for polymerization to obtain the vinyl polymer latex claimed herein.

To obtain cationic acrylic latexes corresponding to the anionic latexes described above, the following changes would be made. The ethylenically unsaturated acid would be replaced with an ethylenically unsaturated amine, such as N,N-dimethylaminoethylmethacrylate, and the neutralizing base would be replaced with a neutralizing acid, such as acetic acid or lactic acid, or the amine could be quaternized with, for example, dimethyl sulfate.

Still another procedure to produce a cationic latex would involve polymerization of vinyl benzylchloride in place of ethylenically unsaturated acid. The resulting polymer would then be quaternized with a tertiary amine, such as dimethylethanol amine.

Surfactants containing a silicon moiety and amido functionality can also be derived from monomeric precursors. For example, a monomeric anhydride such as dodecenylsuccinnic anhydride can be reacted with an aminoalkoxysilane to yield an acid amide with the amide group containing the silicon moiety (alkoxysilane). This material, when neutralized with a base, functions as a surfactant. Thus after making the acid amide, ethylenically unsaturated monomers are added and the mixture neutralized and dispersed in water and polymerized to yield the vinyl polymer latex.

The aqueous polymer emulsion latex obtained from the procedures defined above is composed of particles comprising a vinyl polymer and a surfactant containing hydrophobic and hydrophilic moieties wherein said latex contains silicon moieties and amido functionalities. The silicon moieties and amido functionalities present are always an integral part of the latex. Although the silicon moiety and the amido functionality do not have to be in the same molecule, it is most preferred to have them in the same molecule and linked to the latex through an organoamido group.

The aqueous polymer emulsion latex herein can be defined by reference to the following structural formula:

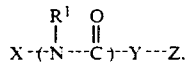

wherein X is an organosilicon moiety as defined above, $R^1$ is hydrogen or an organic group containing from 1 to 7 carbon atoms, such as an alkyl group, preferably methyl or ethyl, Y is a nitrogen, oxygen or carbon or a bond, and Z is an organic moiety derived from a molecule containing a ZF moiety, where F is a functional group which can be transformed into an amidoorganosilane by the reaction of the functional group F with an organosilane, such as an aminoorganosilane or an isocyanatoorganosilane. There can be more than one F group per molecule. If there are more than one F group on Z, the product can be transformed to a polyamido product, namely

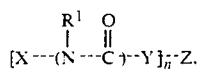

n being the integers 1 or more. Z is the organic moiety of the molecule ZF. Z usually has a surfactant structure which contains a hydrophobic group and a hydrophilic group.

We can use a monosubstituted Z such as ZF for illustration. If we have $(NCO)C_7H_{14}COOH$ as Z—F or Z—NCO. in this case, F is an NCO and Z is $C_7H_{14}COOH$ or a substituted octanoic acid. In this Z, there is a hydrophobic group ad a hydrophilic group. The reaction of Z—NCO wit 3-aminopropyltrimethoxysilane will form Z—NH—CO—NH—$(CH_2)_3Si(OCH_3)_3$. The product is an amide commonly known as urea.

If the ZF is Z—OH, the F group is an hydroxy group and Z is the same as above. The reaction of Z—OH with 3-isocyanatopropyltrimethoxy silane will form Z—O—CO—NH—$(CH_2)_3Si(OCH_3)_3$. The product is an amide commonly known as urethane.

If we have Z—COOH or a material having a structural formula $(COOH)C_7H_{14}COOH$, the functional group F is COOH and Z is Z'—$CH_2COOH$ or $C_7H_{14}COOH$. The reaction with 3-isocyanato-propyltrimethoxysilane will form Z'—$CH_2$—CO—NH—$(CH_2)_3Si(OCH_3)_3$ or S—CO—NH—$(CH_2)_3Si(OCH_3)_3$. We use Z' to denote that the amido group is linked to a carbon atom. The product is commonly known as an amide.

In some cases, Z is a hydrophobic group and the hydrophilic group is formed during the amidosilane formation. For example, if we have octylsuccinic anhydride, $C_8H_{17}(C_5H_3O_3)$, or ZF, the F in the ZF is a substituted succinic anhydride and Z is an octyl group. The reaction of ZF with 3-aminopropyl trimethoxysilane will form Z—CH—[CO—NH—$(CH_2)$-$_3Si(OCH_3)_3$]$CH_2COOH$ or $C_8H_{17}$—CH—[CO—NH—$(CH_2)_3Si(OCH_3)_3$]$CH_2COOH$. This product is an amidoorganosilane substituted dodecyl carboxylic acid or $C_{10}H_{20}COOH[CO—NH—(CH_2)_3Si(OCH_3)_3]$. The hydrophilic group, COOH, is formed in this amide forming reaction.

The vinyl polymer latexes defined herein can be employed as coating compositions, with or without dilution with water or an organic solvent. They can be applied to any conventional substrate, for example wood, metal, glass, cloth, including cloth made of glass fibers, plastics, foams, etc., using any conventional procedure, such as brushing, dipping, flow coating, spraying, etc. Conventional additives, such as pigments, dyes, emulsifiers, thickeners, heat stabilizers, leveling agents, anticratering agents, fillers, sedimentation inhibitors, UV absorbers, antioxidants, defoamers, etc. can also be incorporated therein.

The amount of coating applied to the substrate will vary depending on many factors, such as the substrate to be coated, the specific latex used, the end result desired, etc. Hardening and curing of the film on the substrate can generally be obtained at ambient conditions, although elevated temperatures, for example, from about 50° to about 300° C., can be used if desired. As pointed out above, the coatings have excellent solvent resistance when compared to similar coatings without the presence therein of the silicon moiety on the surfactant.

The invention defined and claimed herein can be further understood in light of the following representative examples.

EXAMPLE 1

Water-Based Crosslinked Latex

A reactor equipped with a stirrer, condenser, thermometer, addition funnel and gas inlet was charged with reactants 1-7 from Table 1. The mixture was heated under nitrogen for about 1.5 hours at about 90° C. A sample had an NCO equivalent weight of 902 (theoretical=916). Reactants 8-9 were then added and the reaction mixture was cooled to 25° C. A second sample showed an NCO equivalent weight of 2237 (theoretical=2159). Reactant 10 was added slowly over approximately 15 minutes, during which time the temperature of the reaction mixture increased to 30° C. Reactant 11 was then added to give Mixture A. In a separate vessel, deionized water (13) and reactant 12 were mixed to give Mixture B. With vigorous stirring, Mixture A was added to Mixture B to yield a stable water based dispersion. The water based dispersion was transferred to another reactor and reactants 14 and 15 were added. Under a nitrogen blanket, the reaction mixture was heated to 30° C. for 0.5 hours and reactant 16 was added. After approximately 20 minutes after reactant 16 was added, the reaction mixture began to exotherm, indicating polymerization of the S/BA (reactants 8-9) was occurring. The reaction mixture exothermed to 60° C. over about a 40-50 minute period. Upon cooling and filtration, the product (an aqueous polymer emulsion latex containing particles composed of (1) the copolymer of styrene and butyl acrylate and (2) the surfactant carrying the silicon moiety from Dynasylan 1505 and an ionic moiety (carboxyl) from dimethylolpropionic acid in a weight ratio of about 60:40) had the specifications shown in Table 2.

TABLE 1

| REACTANTS | |
|---|---|
| 1. Desmodur W[a] | 140.4 |
| 2. DDI-1410 Diisocyanate[b] | 81.5 |
| 3. Dimethylolpropionic acid | 43.9 |
| 4. Terathane 2000[c] | 65.5 |
| 5. Formrez 55-56[d] | 65.5 |
| 6. N-methylpyrrolidone | 109.1 |
| 7. Dibutyltin dilaurate | 0.7 |
| 8. Styrene | 549.7 |
| 9. Butyl acrylate | 137.4 |
| 10. Dynasylan 1505[e] | 52.5 |
| 11. Triethylamine | 36.7 |
| 12. Ethylenediamine | 7.4 |
| 13. Deionized water | 1311.7 |
| 14. Ammonium persulfate | 0.7 |
| 15. Sodium metabisulfite | 0.7 |
| 16. Sodium metabisulfite | 0.7 |

[a]Methylene bis(isocyanato cyclohexane) - Mobay Corporation.
[b]Dimer acid diisocyanate - Henkel Corporation.
[c]Polyoxybutylene glycol 2000 MW - DuPont.
[d]Neopentyl adipate MW 2000 - Witco Corporation.
[e]3-aminopropylmethyldiethoxysilane - Huls Corporation.

TABLE 2

| WATER-BASED LATEX PROPERTIES | |
|---|---|
| 1. Non-volatiles | 42.8% |
| 2. Acid Value (meq./g of latex solids) | 0.112 |
| 3. Amine value (meq./g of latex solids) | 0.135 |
| 4. Percent neutralization | 119.5% |
| 5. Brookfield Viscosity #1@60 RPM | 78.2 cps |

EXAMPLE 2

Water-Based Crosslinked Latex

In a procedure essentially identical to that described in Example 1, the reactants of Table 3 were charged as follows: Reactants 1-7, reactants 8-10, reactant 11, reactant 12, disperse into reactants 13-14, reactant 15 and polymerize. Initiate polymerization at 50° C. with exotherm to 78° C.

TABLE 3

| REACTANTS | |
|---|---|
| 1. Desmodur W | 140.4 |
| 2. DDI-1410 Diisocyanate | 81.5 |
| 3. Dimethylolpropionic acid | 43.9 |
| 4. Terathane 2000 | 65.5 |
| 5. Formrez 55-56 | 65.5 |
| 6. N-methylpyrrolidone | 109.1 |
| 7. Dibutyltin dilaurate | 0.7 |
| 8. Styrene | 522.2 |
| 9. Butyl acrylate | 137.4 |
| 10. Ethyleneglycol dimethacrylate (Cross-linking agent) | 27.5 |
| 11. Dynasylan 1505 | 52.5 |
| 12. Triethylamine | 36.7 |
| 13. Ethylenediamine | 7.4 |
| 14. Deionized water | 1311.4 |
| 15. Ammonium persulfate | 0.7 |

EXAMPLE 3

Grafted Latex

In a procedure essentially identical to that of Example 1, the reactants of Table 4 were reacted in the following order: Reactants 1-7, reactants 8-9, reactant 10, reactant 11, reactant 12, disperse into reactants 13-14, reactant 15, reactant 16 and polymerize. Initiate at 30° C. with exotherm to 74° C.

TABLE 4

| REACTANTS | |
|---|---|
| 1. Desmodur W | 140.4 |
| 2. DDI-1410 Diisocyanate | 81.5 |
| 3. Dimethylolpropionic acid | 43.9 |
| 4. Terathane 2000 | 65.5 |
| 5. Formrez 55-56 | 65.5 |
| 6. N-methylpyrrolidone | 106.2 |
| 7. Dibutyltin dilaurate | 0.7 |
| 8. Styrene | 560.6 |
| 9. Butyl acrylate | 140.2 |
| 10. Dynasylan 1505 | 52.5 |
| 11. t-Butylaminoethyl methacrylate (added to the urethane to provide a graft site for the latex) | 10.2 |
| 12. Triethylamine | 36.7 |
| 13. Ethylenediamine | 6.3 |
| 14. Deionized water | 1343.6 |
| 15. Ammonium persulfate | 0.7 |
| 16. Sodium metabisulfite | 0.7 |

EXAMPLE 4

Grafted and Cross-linked Latex

In a procedure essentially identical to that of Example 1, the reactants of Table 5 were reacted in the following order: Reactants 1-7, reactants 8-10, reactant 11, reactant 12, reactant 13, disperse into reactants 14-15, reactant 16, reactant 17 and initiate polymerization at 30° C. with exotherm to 57° C.

TABLE 5

| REACTANTS | |
|---|---|
| 1. Desmodur W | 140.4 |
| 2. DDI-1410 Diisocyanate | 81.5 |
| 3. Dimethylolpropionic acid | 43.9 |
| 4. Terathane 2000 | 65.5 |
| 5. Formrez 55-56 | 65.5 |
| 6. N-methylpyrrolidone | 104.8 |
| 7. Dibutyltin dilaurate | 0.7 |
| 8. Styrene | 482.6 |
| 9. Butyl acrylate | 137.9 |
| 10. Ethylenglycol dimethacrylate (Cross-linking agent) | 68.9 |
| 11. Dynasylan 1505 | 52.5 |
| 12. T-Butylaminoethyl methacrylate (Grafting agent) | 5.2 |
| 13. Triethylamine | 36.7 |
| 14. Ethylenediamine | 7.2 |
| 15. Deionized water | 1325.3 |
| 16. Ammonium persulfate | 0.7 |
| 17. Sodium metabisulfite | 0.7 |

EXAMPLE 5

Grafted Latex with Ammonia for Neutralization

In a procedure similar to that of Example 1 except that the neutralizing amine (ammonia) was added in the aqueous phase rather than added to the solution phase as was triethylamine, the reactants of Table 6 were reacted as follows: Reactants 1-7, reactants 8-9, reactant 10, reactant 11, dispersed into reactants 12-14, reactant 15, reactant 16 and initiate polymerization at 50° C. with exotherm to 79° C.

TABLE 6

| REACTANTS | |
|---|---|
| 1. Desmodur W | 140.4 |
| 2. DDI-1410 Diisocyanate | 81.5 |
| 3. Dimethylolpropionic acid | 43.9 |
| 4. Terathane 2000 | 65.5 |
| 5. Formrez 55-56 | 65.5 |
| 6. N-methylpyrrolidone | 108.3 |
| 7. Dibutyltin dilaurate | 0.7 |

TABLE 6-continued

| REACTANTS | |
|---|---|
| 8. Styrene | 570.9 |
| 9. Butyl acrylate | 142.7 |
| 10. Dynasylan 1505 | 52.5 |
| 11. t-Butylaminoethyl methacrylate | 20.4 |
| 12. Ammonia (28% solution) | 21.8 |
| 13. Ethylenediamine | 4.4 |
| 14. Deionized water | 1385.5 |
| 15. Ammonium persulfate | 1.1 |
| 16. Sodium metabisulfite | 1.1 |

EXAMPLE 6

Grafted Latex Without Polyols

In a procedure similar to that of Example 1 except that no polyol other than dimethylolpropionic acid was used, the reactants of Table 7 were added as follows: Reactants 1-5, reactant 6-7, reactant 8, reactant 9, reactant 10. disperse into reactants 11-12, reactant 13, reactant 14 and initiate polymerization at 50° C. with exotherm to 74° C.

TABLE 7

| REACTANTS | |
|---|---|
| 1. Desmodur W | 140.4 |
| 2. DDI-1410 Diisocyanate | 81.5 |
| 3. Dimethylolpropionic acid | 59.9 |
| 4. N-methylpyrrolidone | 145.2 |
| 5. Dibutyltin dilaurate | 0.7 |
| 6. Methyl methacrylate | 284.7 |
| 7. Butyl acrylate | 189.8 |
| 8. Dynasylan 1505 | 52.5 |
| 9. t-Butylaminoethyl methacrylate | 16.5 |
| 10. Triethylamine | 49.7 |
| 11. Ethylenediamine | 7.5 |
| 12. Deionized water | 1198.8 |
| 13. Ammonium persulfate | 0.7 |
| 14. Sodium metabisulfite | 0.7 |

EXAMPLE 7—COMPARISON BETWEEN SILANE AND NON-SILANE LATEX

Two latexes were made by essentially identical procedures which were similar to those described in the above examples except in the order of addition of the reactants. Table 8 gives the compositions of the reactants. The order of addition was as follows: Reactants 1-7, reactants 8-9, reactant 10. In the non-silane containing example, the solution polymer was dispersed into reactants 11 and 13, reactant 14 was added and then the polymerization was initiated. In the silane containing example, the solution polymer was dispersed into reactant 13, reactant 12 was added, reactant 14 was added and the polymerization was initiated.

TABLE 8

| REACTANTS | Silane Containing | Non-Silane |
|---|---|---|
| 1. Desmodur W | 140.4 | 140.4 |
| 2. DDI-1410 Diisocyanate | 81.5 | 81.5 |
| 3. Dimethylolpropionic acid | 43.9 | 43.9 |
| 4. Terathane 2000 | 65.5 | 65.5 |
| 5. Formrez 55-56 | 65.5 | 65.5 |
| 6. N-methylpyrrolidone | 113.7 | 108.7 |
| 7. Dibutyltin dilaurate | 0.7 | 0.7 |
| 8. Styrene | 496.8 | 495.0 |
| 9. Butyl acrylate | 124.2 | 123.8 |
| 10. Triethylamine | 36.7 | 36.7 |
| 11. Ethylenediamine | 0.0 | 16.5 |
| 12. A1120$^a$ | 61.1 | 0.0 |
| 13. Deionized water | 1612.2 | 1539.5 |

TABLE 8-continued

| REACTANTS | Silane Containing | Non-Silane |
|---|---|---|
| 14. Ammonium persulfate | 0.7 | 0.7 |

$^a$A1120 N-(2-aminoethyl)-3-aminopropyltrimethoxysilane from Union Carbide Corporation Two paints were made from the above two latexes as shown in Table 9 below:

TABLE 9

| | Silane Containing | Non-Silane |
|---|---|---|
| Silane Containing | 243.5 | 0.0 |
| Non-silane Containing | 0.0 | 243.5 |
| VAG 3642$^a$ | 149.3 | 149.3 |
| Ammonium Benzoate | 10.0 | 10.0 |

$^a$VAG 3642 is a white tint paste from Cardinal Tints.

The paints were applied to Bonderite 1000 treated steel panels by spray and cured 15 minutes at 150° F. The Table 10 below compares the solvent and chemical cleaner resistance of the two paints. The ratings are based on a scale of 1 to 5 with a 5 being the best and 1 the worst.

TABLE 10

| RATINGS OF SOLVENT CLEANER RESISTANCE | | |
|---|---|---|
| Test | Silane Containing | Non-Silane |
| 5 minutes Isopropanol | 4 | 1 |
| 15 minutes Formula 409 cleaner | 5 | 3 |
| 15 minutes Xerox A cleaner$^a$ | 5 | 3 |

$^a$Proprietary organic cleaner from Xerox Corp.

The test results clearly demonstrate the improvement in solvent resistance and chemical cleaner resistance of a silane and amido containing paint compared to that of a comparable paint except that it does not contain silane.

EXAMPLE 8

Preparation of Amido Functional Urethane/Silicon Containing Acrylic Latex

This example describes the synthesis of an amido functional urethane resin not containing silicon moieties and an acrylic resin containing only silicon moieties.

An acrylic solution resin was synthesized as follows. Reactants 9-10 of TABLE 11 was charged to a flask and heated under nitrogen to 105° C. Reactants 1-5 and a mixture of 6-8 were added over a 3 hour period. 25 milliliters of the mixture of 6-8 were held back as a chaser and added after the initial polymerization and the reaction mixture held for 1 hours at 105° C. after which it was cooled to room temperature and gave a solution polymer having 70.9 percent solids.

TABLE 11

| REACTANTS | |
|---|---|
| 1. Methyl methacrylate | 295.0 g |
| 2. Butyl acrylate | 295.0 g |
| 3. Butyl methacrylate | 180.0 g |
| 4. Acrylic Acid | 80.0 g |
| 5. 3-methacryloxypropyltrimethoxysilane | 150.0 g |
| 6. Lupersol 575$^a$ | 30.0 g |
| 7. Butanol | 24.0 g |
| 8. N-Methylpyrrolidone | 36.0 g |
| 9. Butanol | 191.2 g |

TABLE 11-continued

| REACTANTS | |
|---|---|
| 10. N-Methylpyrrolidone | 286.8 g |

*Lupersol 575-Lucidol Division of Pennwalt Corporation

An aqueous dispersion of an amido functional polyurethane not containing silicon moieties (WRV-7255 available from PPG Industries. Inc.) at 32.4 percent solids was used with an acrylic polymer surfactant containing silicon moieties and was made as follows.

Reactants 1-6 of TABLE 12 were blended together to give a solution polymer containing ethylenically unsaturated monomers. This blend was then dispersed into Reactants 7-8 and Reactants 9-10 were added. The temperature was increased to 50° C. to initiate polymerization of the monomers. After an exotherm to 67° C. the product was cooled to give an aqueous polymer emulsion latex having solids content of 35.7 percent and containing an amido functional surfactant without silicon moieties and an acrylic surfactant with silicon moieties and a vinyl polymer emulsion latex.

TABLE 12

| REACTANTS | |
|---|---|
| 1. Acrylic solution resin from Table 11 | 100.0 g |
| 2. Methyl methacrylate | 26.4 g |
| 3. Butyl acrylate | 45.6 g |
| 4. Butyl methacrylate | 37.2 g |
| 5. Ethyleneglycol dimethacrylate | 9.6 g |
| 6. Dimethylethanol amine | 4.9 g |
| 7. WRV-7255ᵃ aqueous polyurethane | 495.0 g |
| 8. Water | 100.0 g |
| 9. Ammonium persulfate | 0.1 g |
| 10. Sodium metabisulfite | 0.1 g |

ᵃWRV-7255 aqueous polyurethane-PPG Industries. Inc.

EXAMPLE 9

Preparation of Amido Functional Silicon Containing/Silicon Containing Acrylic Latex This example describes the synthesis of an amido functional. silicon containing urethane resin and an acrylic resin containing only silicon moieties.

An acrylic solution polymer was prepared as follows. A reactor under nitrogen was charged with Reactants 9-10 of TABLE 13 and was heated to 105° C. Reactants 1-5 and 6-8 were added over a 3 hour period. 25 milliliters of Reactants 6-8, held back as chaser were added and the mixture held for 1 hour at 105° C. to yield an acrylic solution polymer containing silicon moieties at 70.9 percent solids.

TABLE 13

| REACTANTS | |
|---|---|
| 1. Methyl methacrylate | 737.5 g |
| 2. Butyl acrylate | 737.5 g |
| 3. Butyl methacrylate | 450.0 g |
| 4. Acrylic acid | 200.0 g |
| 5. 3-Methacryloxypropyltrimethoxysilane | 375.0 g |
| 6. Lupersol 575 | 75.0 g |
| 7. Butanol | 105.0 g |
| 8. N-Methylpyrrolidone | 45.0 g |
| 9. Butanol | 645.0 g |
| 10. N-Methylpyrrolidone | 276.0 g |

A polyurethane containing amido functionality and silicon moieties and the latex prepared therefrom is a follows. A reactor is charged with Reactants 1-5 of TABLE 14, heated to 90° C. and held until and an NCO equivalent weight of 750 (768 theoretical NCO equivalent weight) was obtained. Reactant 6 was added, followed by Reactant 10, 7, 8 and 9. Reactant 12 was added followed by Reactant 13. The above solution polymer (i.e. Reactants 1-13) was added to Reactants 11 and 14 with stirring to obtain a water based dispersion. Reactants 14-15 were added and the dispersion heated to 60° C. to initiate the emulsion polymerization. After an exotherm to 73° C. the vinyl latex emulsion was cooled to yield a latex having a solids content of 32.3 percent and contained a polyurethane surfactant (6 weight percent of total latex solids) containing amido functionality (0.6 weight percent of total latex solids) and silicon moieties and an acrylic surfactant (34 weight percent of total latex solids) containing silicon moieties. The addition of the polyurethane surfactant dramatically improved the water soak resistance (overnight immersion in 50° C. water followed by measuring adhesion loss), solvent resistance and blister resistance compared to the latex containing only the acrylic surfactant.

TABLE 14

| REACTANTS | |
|---|---|
| 1. Desmodur W | 175.4 g |
| 2. Dimethylolpropionic acid | 43.8 g |
| 3. Formrez 55-56 | 131.0 g |
| 4. Dibutyltin dilaurate | 0.7 g |
| 5. N-Methylpyrrolidone | 84.0 g |
| 6. Butyl methacrylate | 1319.4 g |
| 7. Methyl methacrylate | 937.1 g |
| 8. Butyl acrylate | 1693.4 g |
| 9. Ethyleneglycol dimethacrylate | 252.1 g |
| 10. Acrylic Resin from Table 13 | 3457.0 g |
| 11. Water | 11901.0 g |
| 12. 3-Aminopropylmethyldiethoxysilane | 53.0 g |
| 13. Triethylamine | 308.0 g |
| 14. Ethylenediamine | 7.1 g |
| 15. Ammonium persulfate | 5.5 g |

We claim:

1. An aqueous polymer emulsion latex composed of particles comprising a vinyl polymer and at least one surfactant containing hydrophobic and hydrophilic moieties wherein said latex contains silicon moieties and amido functionalities.

2. The aqueous polymer emulsion latex of claim 1 wherein said silicon moieties are linked to said latex through an organoamido group.

3. The aqueous polymer emulsion latex of claim 2 wherein said linkage is to said surfactant.

4. The aqueous polymer emulsion latex of claim 1 wherein the silicon moieties and amido functionalities are attached to two different resins.

5. The aqueous polymer emulsion latex of claim 1 wherein said amido functionality is linked to said latex through a nitrogen, oxygen or carbon bond.

6. The aqueous polymer emulsion latex of claim 5 wherein said linkage is a nitrogen bond.

7. The aqueous polymer emulsion latex of claim 5 wherein said linkage is an oxygen bond.

8. The aqueous polymer emulsion latex of claim 5 wherein said linkage is a carbon bond.

9. The aqueous polymer emulsion latex of claim 1 wherein said amido functionality is linked to said surfactant through a nitrogen, oxygen or carbon bond.

10. The aqueous polymer emulsion latex of claim 9 wherein said amido functionality is linked to said surfactant through a nitrogen bond.

11. The aqueous polymer emulsion latex of claim 9 wherein said amido functionality is linked to said surfactant through an oxygen bond.

12. The aqueous polymer emulsion latex of claim 9 wherein said amido functionality is linked to said surfactant through a carbon bond.

13. The aqueous polymer emulsion latex of claim 2 wherein said linkage is represented by the following structural formula:

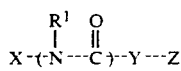

wherein X is a silicon containing moiety, R$^1$ is hydrogen or an organic group containing 1 to 7 carbon atoms and Y is a nitrogen, oxygen or carbon and Z is an organic moiety.

14. The aqueous polymer emulsion latex of claim 3 wherein said linkage is represented by the following structural formula:

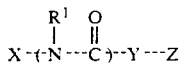

wherein X is a silicon containing moiety, R$^1$ is a hydrogen or an organic group containing 1 to 7 carbon atoms and Y is a nitrogen, oxygen or carbon and Z is an organic moiety.

15. The aqueous polymer emulsion latex of claim 13 wherein the organic moiety Z is derived from a molecule containing a ZF moiety where F is a functinal group which can be transformed into an amidoorganosilane by the reaction of the functional group with an organosilane.

16. The aqueous polymer emulsion latex of claim 14 wherein the organic moiety Z is derived from a molecule containing a ZF moiety where F is a functinal group which can be transformed into an amidoorganosilane by the reaction of the functional group with an organosilane.

17. The aqueous polymer emulsion latex of claim 14 wherein Z is the organic residue of an organic surfactant containing hydrophobic and hydrophilic groups.

18. The aqueous polymer emulsion latex of claim 14 wherein Z is the organic residue of an organic surfactant containing hydrophobic and hydrophilic groups minus a carbon atom.

19. The aqueous polymer emulsion latex of claim 1 wherein the surfactant is polymeric.

20. The aqueous polymer emulsion latex of claim 1 wherein the surfactant is monomeric.

21. The aqueous polymer emulsion latex of claim 1 wherein said hydrophilic moiety is ionic.

22. The aqueous polymer emulsion latex of claim 21 wherein said hydrophilic moiety is anionic.

23. The aqueous polymer emulsion latex of claim 21 wherein said hydrophilic moiety is cationic.

24. The aqueous polymer emulsion latex of claim 22 wherein said anionic moiety is derived from a carboxylic acid.

25. The aqueous polymer emulsion latex of claim 22 wherein said latex has an anionic functionality of about 0.018 to about 2.25 milliequivalents per gram based on the solids content of said latex.

26. The aqueous polymer emulsion latex of claim 22 wherein said latex has an anionic functionality of about 0.036 to about 1.8 milliequivalents per gram based on the solids content of said latex.

27. The aqueous polymer emulsion latex of claim 22 wherein said latex has an anionic functionality of about 0.048 to about 1.60 milliequivalents per gram based on the solids content of said latex.

28. The aqueous polymer emulsion latex of claim 1 wherein said latex has a concentration of about 0.002 to about 6.0 weight percent of silicon based upon the solids content of said latex.

29. The aqueous polymer emulsion latex of claim 1 wherein said latex has a concentration of about 0.008 to about 4.0 weight percent of silicon based upon the solids content of said latex.

30. The aqueous polymer emulsion latex of claim 1 wherein said latex has a concentration of about 0.012 to about 2.5 weight percent of silicon based upon the solids content of said latex.

31. The aqueous polymer emulsion latex of claim 1 wherein said silicon moiety is represented by the following structural formula:

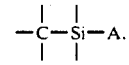

wherein A represents, for example, OH, OR$^2$,

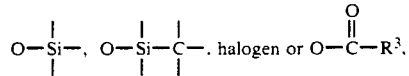

R$^2$ representing an alkyl group having one to four carbon atoms and R$^3$ representing hydrogen or an alkyl group having one to four carbon atoms.

32. The aqueous polymer emulsion latex of claim 1 wherein said silicon moiety is derived from a dialkoxysilane.

33. The aqueous polymer emulsion latex of claim 1 wherein said silicon moiety is derived from a trialkoxysilane.

34. The aqueous polymer emulsion latex of claim 1 wherein said surfactant is a polyurethane surfactant.

35. The aqueous polymer emulsion latex of claim 1 wherein said surfactant is a polyacrylate surfactant.

36. The aqueous polymer emulsion latex of claim 1 wherein said vinyl polymer is grafted to the surfactant.

37. The aqueous polymer emulsion latex of claim 1 wherein said vinyl polymer is cross-linked to the surfactant.

38. The aqueous polymer emulsion latex of claim 1 wherein said vinyl polymer is cross-linked and grafted to the surfactant.

39. The aqueous polymer emulsion latex of claim 1 wherein said vinyl polymer is neither crosslinked or grafted to the surfactant.

40. The aqueous polymer emulsion latex of claim 1 wherein the weight ratio of said surfactant to said vinyl polymer is in the range of about 90:10 to about 10:90.

41. The aqueous polymer emulsion latex of claim 1 wherein the weight ratio of said surfactant to said vinyl polymer is in the range of about 70:30 to about 30:70.

42. The aqueous polymer emulsion latex of claim 1 wherein the weight ratio of said surfactant to said vinyl polymer is in the range of about 60:40 to about 40:60.

43. The aqueous polymer emulsion latex of claim 1 wherein the solids content of the latex is in the range of 5 to about 60 weight percent.

44. The aqueous polymer emulsion latex of claim 1 wherein the solids content of the latex is in the range of 20 to about 50 weight percent.

45. The coating composition containing an aqueous polymer emulsion latex composed of particles comprising a vinyl polymer and at least one surfactant containing hydrophobic and hydrophilic moieties wherein said latex contains silicon moieties and amido functionalities.

46. The coating composition of claim 45 wherein said surfactant comprises a polyurethane surfactant.

47. The coating composition of claim 45 wherein said surfactant comprises a polyacrylate surfactant.

48. The coating composition of claim 45 wherein said vinyl polymer is grafted to the surfactant.

49. The coating composition of claim 45 wherein said vinyl polymer is cross-linked.

50. The coating composition of claim 45 wherein said vinyl polymer is cross-linked and grafted to the surfactant.

51. The coating composition of claim 45 wherein said vinyl polymer is neither cross-linked or grafted to the surfactant.

52. A process for preparing an aqueous polymer emulsion latex which comprises polymerizing ethylenically unsaturated monomers in the presence of surfactants containing hydrophobic and hydrophilic moieties, silicon moieties and amido functionalities.

53. The process of claim 52 wherein said silicon moieties and amido functionalities are linked to said latex.

54. The process of claim 52 wherein said silicon moieties and amido functionalities are linked to said surfactants.

55. The process of claim 52 wherein said amido functionalities are linked to said surfactants through a nitrogen, oxygen or carbon bond.

56. The process of claim 52 wherein said silicon moieties are linked to said surfactants through an organoamido group.

57. The process of claim 52 wherein said surfactant is a polyurethane surfactant.

58. The process of claim 52 wherein said surfactant is a polyacrylate surfactant.

59. A substrate carrying a coating composition containing an aqueous polymer emulsion latex composed of particles comprising a vinyl polymer and a surfactant containing hydrophobic and hydrophilic moieties wherein said latex contains silicon moieties and amido functionalities.

60. The substrate of claim 59 wherein said surfactant is a polyurethane surfactant.

61. The substrate of claim 59 wherein said surfactant is a polyacrylate surfactant.

* * * * *